(12) United States Patent
Urushibata et al.

(10) Patent No.: US 9,892,399 B2
(45) Date of Patent: *Feb. 13, 2018

(54) READING APPARATUS

(71) Applicant: TOSHIBA TEC KABUSHIKI KAISHA, Shinagawa-ku, Tokyo (JP)

(72) Inventors: Yoshimi Urushibata, Shizuoka (JP); Toshihiro Kaneko, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/592,376

(22) Filed: May 11, 2017

(65) Prior Publication Data
US 2017/0243191 A1    Aug. 24, 2017

Related U.S. Application Data

(63) Continuation of application No. 14/607,153, filed on Jan. 28, 2015, now Pat. No. 9,679,282.

(30) Foreign Application Priority Data

Feb. 10, 2014    (JP) .................................. 2014-023601

(51) Int. Cl.
 *G06K 7/01*    (2006.01)
 *G06Q 20/20*    (2012.01)
 (Continued)

(52) U.S. Cl.
 CPC ......... *G06Q 20/208* (2013.01); *G06Q 20/202* (2013.01); *G07G 1/0036* (2013.01);
 (Continued)

(58) Field of Classification Search
 CPC ..................................................... G06K 7/01
 See application file for complete search history.

(56) References Cited

U.S. PATENT DOCUMENTS 5,900,614 A * 5/1999 Nakakawaji ............ A47F 9/048
                                                235/462.14
6,390,363 B1 * 5/2002 Morrison ................. A47F 9/047
                                                235/383
(Continued)

FOREIGN PATENT DOCUMENTS

CN    102194094    9/2011
CN    103198405    7/2013
(Continued)

OTHER PUBLICATIONS

Non-Final Office Action for U.S. Appl. No. 14/607,153 dated May 7, 2015.

(Continued)

*Primary Examiner* — Christle I Marshall
(74) *Attorney, Agent, or Firm* — Amin, Turocy & Watson LLP; Gregory Turocy

(57) ABSTRACT

In accordance with one embodiment, a reading apparatus is arranged between an operator and a customer who stand in a face-to-face manner. The reading apparatus includes a main body, a first image capturing section for the operator, a second image capturing section for the customer, and a first display section for the operator. The main body has an opening on a surface thereof facing the operator. The first image capturing section is housed in the main body and photographs a commodity through the opening of the main body. The second image capturing section is arranged at the main body and photographs an object held by the customer. The first display section is arranged above the opening of the main body and displays information relating to sales registration processing. The main body has an upper surface inclined downwards from the operator side to the customer side, and the second image capturing section is arranged at the inclined upper surface.

3 Claims, 7 Drawing Sheets

(51) Int. Cl.
 G07G 1/00 (2006.01)
 G07G 1/01 (2006.01)
 G07G 1/12 (2006.01)
 H04N 5/247 (2006.01)
 H04N 5/225 (2006.01)
(52) U.S. Cl.
 CPC ............... G07G 1/01 (2013.01); G07G 1/12 (2013.01); H04N 5/2252 (2013.01); H04N 5/247 (2013.01)

(56) References Cited

U.S. PATENT DOCUMENTS

| | | | | |
|---|---|---|---|---|
| 6,829,467 | B2* | 12/2004 | Ochiai | G06Q 20/105 235/380 |
| 7,000,833 | B2* | 2/2006 | Sato | G07G 1/0045 186/59 |
| 7,841,524 | B2* | 11/2010 | Schmidt | A47F 9/04 177/25.15 |
| 7,970,650 | B2* | 6/2011 | Tokorotani | G06Q 20/204 361/27 |
| 8,360,320 | B2* | 1/2013 | Collins | G06K 7/10 186/59 |
| 8,702,002 | B2* | 4/2014 | Gregerson | G07G 1/0045 235/462.06 |
| 2007/0241184 | A1 | 10/2007 | Lum | |
| 2007/0255665 | A1* | 11/2007 | Oosugi | A47F 9/047 705/414 |
| 2011/0142371 | A1* | 6/2011 | King | G06Q 30/00 382/313 |
| 2011/0220712 | A1 | 9/2011 | Nakaeda | |
| 2011/0225055 | A1* | 9/2011 | Takahashi | G06Q 20/20 705/16 |
| 2011/0309147 | A1* | 12/2011 | Barkan | G06K 7/10554 235/440 |
| 2013/0101168 | A1* | 4/2013 | Naito | G07G 1/145 382/103 |
| 2013/0193210 | A1* | 8/2013 | Iizaka | G07G 1/0045 235/454 |
| 2013/0259320 | A1* | 10/2013 | Gotanda | G06Q 30/0623 382/110 |
| 2015/0227908 | A1* | 8/2015 | Urushibata | G06Q 20/208 705/23 |

FOREIGN PATENT DOCUMENTS

| | | |
|---|---|---|
| CN | 203217674 | 9/2013 |
| JP | 2000-067322 | 3/2000 |
| JP | 2005-157572 | 6/2005 |
| JP | 2006-99174 | 4/2006 |
| JP | 2012-53785 | 3/2012 |
| JP | 2012-195007 | 10/2012 |
| JP | 2013-89085 | 5/2013 |
| JP | 2013-152761 | 8/2013 |
| JP | 2013-210971 | 10/2013 |
| JP | 2013-214336 | 10/2013 |

OTHER PUBLICATIONS

Final Office Action for U.S. Appl. No. 14/607,153 dated Sep. 29, 2015.
Non-Final Office Action for U.S. Appl. No. 14/607,153 dated Feb. 1, 2016.
Final Office Action for U.S. Appl. No. 14/607,153 dated Jul. 12, 2016.
Non-Final Office Action for U.S. Appl. No. 14/607,153 dated Sep. 28, 2016.
Japanese Office Action for Japanese Patent Application No. 2014-023601 dated Nov. 22, 2016.
Chinese Office Action for Chinese Patent Application No. 201510024345.5 dated Aug. 18, 2017.

* cited by examiner

FIG.2
(a)
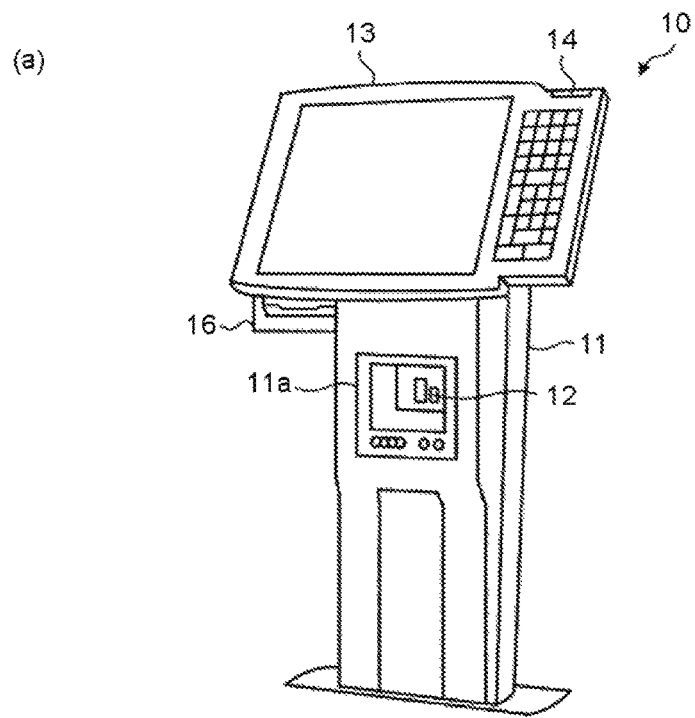
(b)
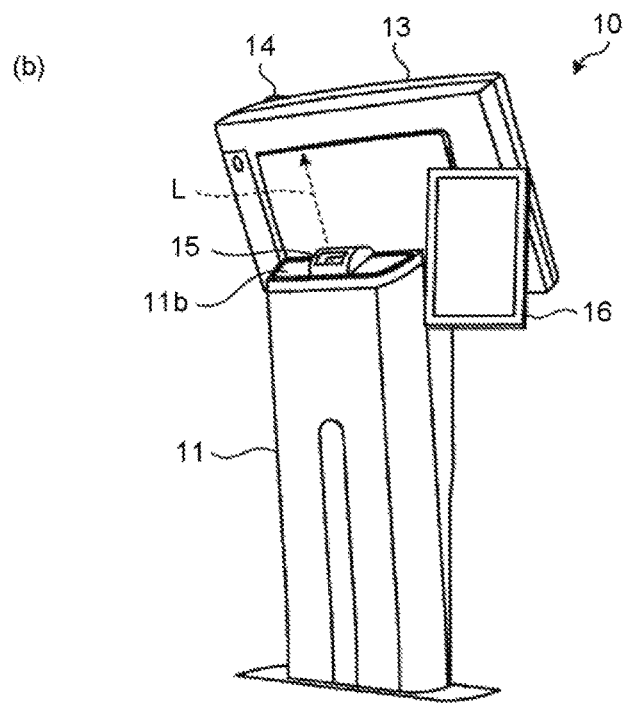

READING APPARATUS

CROSS-REFERENCE TO RELATED APPLICATIONS

This application is a Continuation of application Ser. No. 14/607,153 filed on Jan. 28, 2015, the entire contents of which are incorporated herein by reference.

This application is based upon and claims the benefit of priority from Japanese Patent Application No. 2014-023601, filed Feb. 10, 2014, the entire contents of which are incorporated herein by reference.

FIELD

Embodiments described herein relate generally to a reading apparatus which scans or reads a commodity or a code symbol attached to the commodity.

BACKGROUND

In a store such as a supermarket and the like, a customer who purchases commodities puts displayed commodities in a shopping basket or a cart and carries the shopping basket or cart to a checkout counter. A shop clerk carries out checkout work at the checkout counter. A reading apparatus such as a barcode scanner for reading commodity information is arranged on the checkout counter. The shop clerk, standing at a position opposite to the customer across the checkout counter, reads the commodities brought by the customer one by one through the reading apparatus to input information relating to the commodity to be purchased.

Conventionally, there are provided various services for promoting sales in the store. For example, a service card such as a membership card, a so-called point card, and the like is distributed to customers, and points that are given according to purchase amount are stored cumulatively in a store server in association with the point card. The given points are used to receive a discount or exchange a commodity corresponding to the point amount from the next transaction and thereafter.

Further, the following service is also performed in the store. Service information indicating that a service such as a discount and the like is provided is announced in an advertisement medium such as a flier and the advertisement medium is widely distributed to customers. And only customers who present the advertisement medium or the service information can receive such a service.

Incidentally, in the constitution of the conventional checkout counter (registration apparatus), in a case in which the customer shows the service card or service information to an operator, the work of the shop clerk (operator) is interrupted, or the customer has to show the service card or service information before the registration work of the shop clerk is started or after the registration work of the shop clerk is completed, in general. As a result, there is a possibility that the work efficiency of the shop clerk is dropped. Further, there is also a problem that showing the service card or service information is too troublesome for customers.

In recent years, it is more and more popular to provide service information through a communication line such as an E-mail, a Web page and the like. In this case, customers receive the service information provided through the communication line with an information communication terminal such as a mobile phone and the like. The customers can show the display screen of the information communication terminal to the shop clerk to enjoy the service. However, there is a possibility that there are some customers who hesitate to show his/her information communication terminal in view of reason for privacy.

BRIEF DESCRIPTION OF THE DRAWINGS

FIG. 2 is a perspective view illustrating a reading apparatus;

DETAILED DESCRIPTION

In accordance with one embodiment, a reading apparatus is arranged at a position between an operator and a customer who stand in a face-to-face manner. The reading apparatus contains a main body having an opening on a surface thereof facing the operator; a first image capturing section for the operator, housed in the main body, configured to photograph a commodity through the opening of the main body to capture an image of the commodity; a second image capturing section for the customer, arranged at the main body, configured to photograph an object held by the customer to capture an image of the object; and a first display section for the operator, arranged above the opening of the main body, configured to display information relating to sales registration processing. The main body has an upper surface inclined downwards from an operator side to a customer side, and the second image capturing section is arranged at the inclined upper surface.

Figure 1:
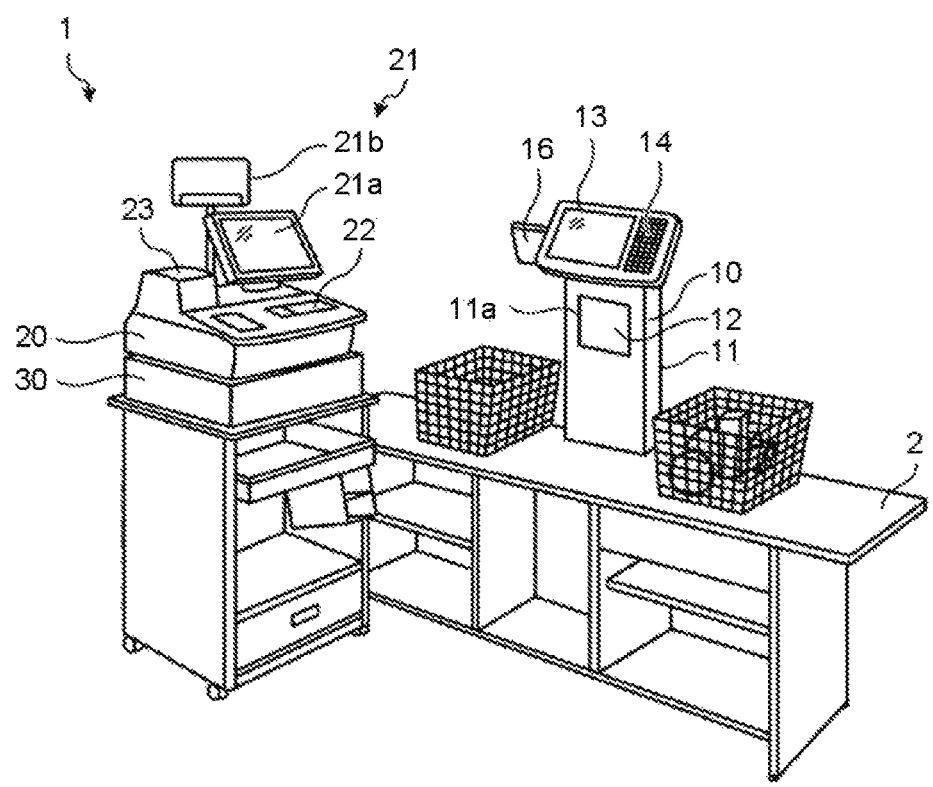
FIG. 1 is a diagram illustrating the whole constitution of a POS system according to one embodiment.

Hereinafter, the present embodiment is described with reference to the accompanying drawings. FIG. 1 is a perspective view illustrating the whole constitution of a POS system 1 according to the embodiment.

As shown in FIG. 1, the POS (Point Of Sales) system 1 (store system) includes a reading apparatus 10 serving as a vertical scanner, and a POS terminal 20 serving as a commodity sales data processing device for executing sales registration processing according to an image captured by the reading apparatus 10. The reading apparatus 10 is arranged on a checkout table 2, on which shopping baskets and the like are placed, at a position (substantially central portion) where an operator and a customer stand in a face to face manner. The POS terminal 20 is arranged nearby one of the end portions of the checkout table 2. The reading apparatus 10 and the POS terminal 20 are connected with each other to be capable of communicating through a transmission line (not shown). The reading apparatus 10 and the POS terminal 20 constitute the store system 1.

The POS terminal 20 executes sales registration processing including checkout processing based on various kinds of data of the commodities purchased by the customer. The POS terminal 20 is arranged above a drawer 30 which stores coins and bills in such a manner that coins and bills can be put in and taken out freely.

The POS terminal 20 is equipped with two display devices 21 including a display for operator 21a and a display for customer 21b, an input device 22 including a keyboard and a mode key, and a receipt printer 23. The display device 21 and the input device 22 constitute a user interface having an information input function for inputting information by the user and an information output function for outputting information to the user.

Next, the constitution of the reading apparatus 10 is described with reference to FIG. 2. FIG. 2 (a) is a perspective view illustrating the reading apparatus 10 at a side of the apparatus 10 where an image capturing window 11a is arranged. FIG. 2 (b) is a perspective view illustrating the reading apparatus 10 at a side of the apparatus 10 opposite to the side where the image capturing window 11a is arranged.

As shown in FIG. 2, the reading apparatus 10 includes a main body 11, a first image capturing section 12, a first display section 13, a keyboard 14, a second image capturing section 15, and a second display section 16.

The main body 11 is formed in a substantially rectangular shape and is arranged on the checkout table 2. The height of the main body 11 on the checkout table 2 is, for example, preferred to be as high as the eyes of an operator.

The image capturing window 11a (opening) is arranged on the surface of the main body 11 facing the operator who stands in front of the reading apparatus 10. The first image capturing section 12 is arranged inside the main body 11 behind the image capturing window 11a. The operator holds the commodity brought by the customer over the image capturing window 11a to read (photograph) the commodity. The first image capturing section 12 is an image sensor including an image capturing element such as a CCD (Charge Coupled Device), a CMOS (Complementary MOS) and the like. The first image capturing section 12 photographs the area outside the main body section 11 through the image capturing window 11a. Specifically, the first image capturing section 12 optically photographs either a code symbol (such as a barcode, a two-dimensional code and the like) attached to the commodity held in front of the image capturing window 11a or the whole or part of that commodity.

The object recognition is described hereafter. The object recognition refers to a technology in which an object photographed by the first image capturing section 12 is specified (recognized) according to a feature amount obtained from the appearance of the object. The POS terminal 20 extracts appearance feature of the photographed commodity from the image (object image) captured by the first image capturing section 12 as the feature amount, and compares the extracted feature amount with the prepared feature amount (reference data) of a reference commodity to specify (recognize) the photographed commodity. The appearance feature of the commodity refers to the shape, tint, concave-convex state and the like.

The first display section 13, serving as a display for operator, is arranged on the main body 11 above the image capturing window 11a. The first display section 13 is constituted by a display device such as an LCD (Liquid Crystal Display) and the like equipped with a touch panel. The first display section 13 displays a commodity name, unit price and the like of the registered commodity to the operator in the sales registration processing carried out by the POS terminal 20.

The keyboard 14 is arranged nearby the first display section 13 in a side by side manner. The keyboard 14 includes various keys and the like for registering the commodity that cannot be registered with the code symbol or object image. It is shown in FIG. 2 that the first display section 13 and the keyboard 14 are arranged integrally, however, they may be arranged separately.

An upper surface 11b of the main body 11 (shown in FIG. 2(b)) is inclined downwards from the operator side to the customer side opposite to the operator side. The second image capturing section 15 is arranged on the inclined surface.

Figure 3:
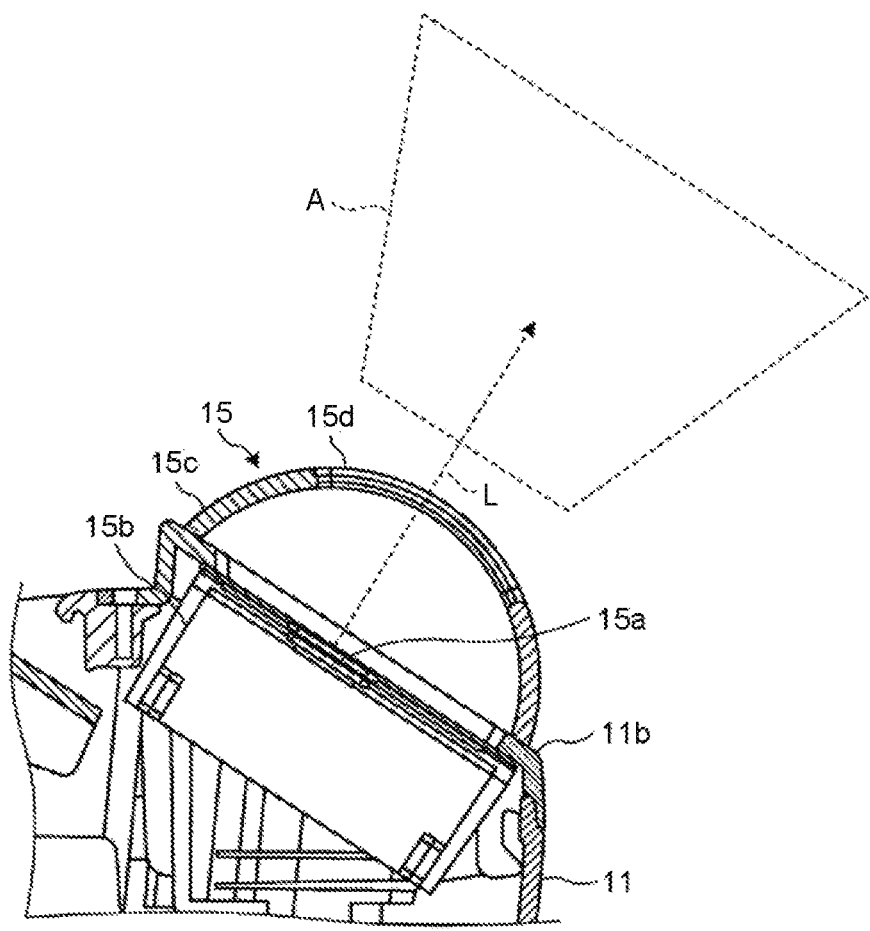
FIG. 3 is a schematic cross-sectional view illustrating the constitution of an upper surface portion of the reading apparatus.

FIG. 3 is a schematic cross-sectional view illustrating the constitution of the upper surface portion of the reading apparatus 10. As shown in FIG. 3, the second image capturing section 15 is arranged in such a manner that a portion thereof is buried in the upper surface 11b. The second image capturing section 15 is provided with an image capturing device 15b including an image capturing element 15a such as a CCD, CMOS and the like, and a cover 15c covering the image capturing device 15b.

The image capturing device 15b is arranged inside the main body 11 (below the upper surface 11b) in parallel to the inclined upper surface 11b. An optical axis direction (image capturing direction) L of the image capturing device 15b is substantially orthogonal to the inclined upper surface 11b, that is, the optical axis direction of the image capturing device 15b is directed to the upper portion of the customer who stands opposite to the operator.

The cover 15c is formed in a substantially semi-cylindrical shape (arch shape). An image capturing window 15d is arranged at a part of the area of the cover 15c of which the center locates on the optical axis direction L of the image capturing device 15b. Light permeable resin or glass is fit into the image capturing window 15d in a manner of matching with the arch shape of the cover 15c. The image capturing device 15b photographs the object held over an area above the image capturing window 15d (image capturing area A) through the image capturing window 15d.

The first image capturing section 12 is used in the reading (photographing) carried out by the operator, while the second image capturing section 15 is used in the reading carried out by the customer. Specifically, the second image capturing section 15 optically photographs a specified object held by the customer. According to the present embodiment, the specified object may be, for example, a service card (membership card, point card and the like) held by the customer. The object to be photographed may also be a paper medium such as an advertisement (flier) on which information announcing a service-sale such as a discount is printed. The object to be photographed may further be a portable communication terminal the display screen of which displays the service-sale information.

It is exemplified in the present embodiment that the second image capturing section 15 is arranged in a state of protruding from the upper surface 11b, however, it is not limited to this. For example, the upper surface 11b may be a flat surface with the cover 15c removed. Further, it is exemplified in the present embodiment that the second image capturing section 15 is integrally arranged with the main body 11, however, the second image capturing section 15 may be arranged separately from the main body 11 in a detachable manner.

Return to FIG. 2. The second display section 16, serving as a display for customer, is arranged nearby the second image capturing section 15. The second display section 16 is constituted by a display device such as an LCD and the like equipped with a touch panel. The second display section 16 displays a commodity name, unit price and the like of the registered commodity to the customer in the sales registration processing carried out by the POS terminal 20. The second display section 16 further displays a message or an image for instructing the reading by the second image capturing section 15. In addition, it is exemplified in the present embodiment that the second display section 16 is supported at a side of the main body 11 by a supporting member (not shown), however, it is not limited to this.

Figure 4:
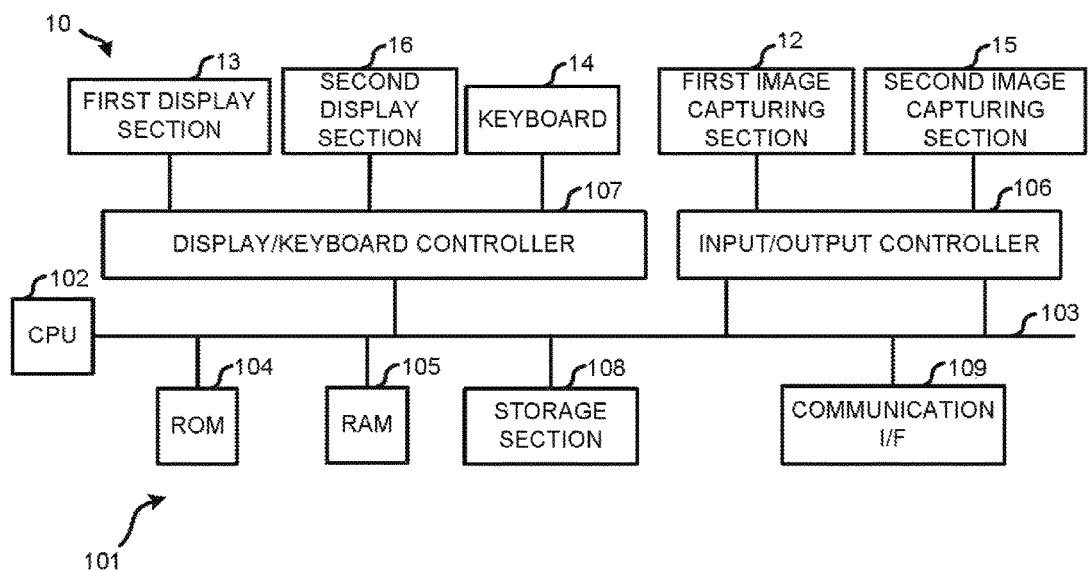
FIG. 4 is a block diagram illustrating the electrical connection of the reading apparatus.

Next, the electrical connection of the reading apparatus 10 is described. FIG. 4 is a block diagram illustrating the electrical connection of the reading apparatus 10. As shown in FIG. 4, the reading apparatus 10 is provided with a microcomputer 101 which controls each section of the apparatus 10. The microcomputer 101 is constituted by connecting a CPU (Central Processing Unit) 102 with a ROM (Read Only Memory) 104 and a RAM (Random Access Memory) 105 through a bus line 103. The CPU functionally controls each section. The ROM 104 stores fixed or basic information such as a control program and the like in advance. The RAM 105 stores various data in a rewritable manner and functions as a work area. Thus, the microcomputer 101 constitutes an information processing section for executing data processing. The entire or part of the RAM 105 is a nonvolatile memory.

The microcomputer 101 is connected with an input/output controller 106, a display/keyboard controller 107, a storage section 108 and a communication interface 109 through the bus line 103.

The input/output controller 106 is connected with the first image capturing section 12 and the second image capturing section 15. The input/output controller 106 outputs the image (image data) captured by the first image capturing section 12 and the second image capturing section 15 to the microcomputer 101. The input/output controller 106 also outputs a control signal output from the microcomputer 101 to the first image capturing section 12 and the second image capturing section 15.

The display/keyboard controller 107 drives the first display section 13 and the second display section 16 to display various images on the display device 21. The display/keyboard controller 107 outputs an operation signal in response to the touch operation on the first display section 13 and the second display section 16, and an operation signal from the keyboard 14 to the microcomputer 101.

The storage section 108 is a storage device such as an HDD (Hard Disk Drive), and an SSD (Solid State Drive). The storage section 108 stores various data relating to the operations of the reading apparatus 10.

The communication interface 109 enables the reading apparatus 10 to carry out data communication with other machines (POS terminal 20) through a connecting wire such as a LAN cable and the like. For example, the communication interface 109 sends images acquired from the first image capturing section 12 and the second image capturing section 15 and operation signal to the POS terminal 20 as an input data. The communication interface 109 receives data for display on the first display section 13 and the second display section 16 from the POS terminal 20.

Figure 5:
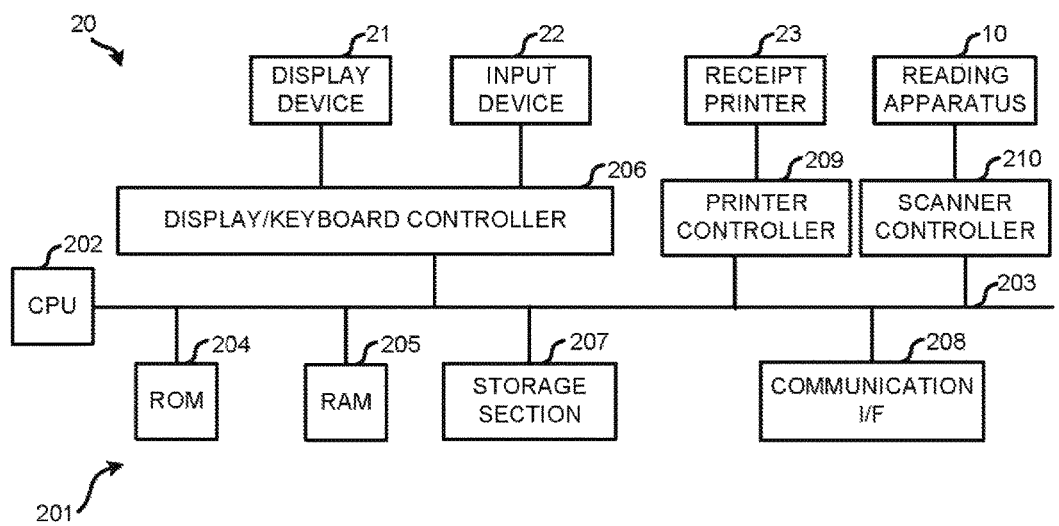
FIG. 5 is a block diagram illustrating the electrical connection of the POS terminal.

Next, the electrical connection of the POS terminal 20 is described. FIG. 5 is a block diagram illustrating the electrical connection of the POS terminal 20. As shown in FIG. 5, the POS terminal 20 is provided with a microcomputer 201 which controls each section of the POS terminal 20. The microcomputer 201 is constituted by connecting a CPU 202 with a ROM (Read Only Memory) 204 and a RAM (Random Access Memory) 205 through a bus line 203. The CPU functionally controls each section. The ROM 204 stores fixed or basic information such as a control program and the like in advance. The RAM 205 stores various data in a rewritable manner and functions as a work area. Thus, the microcomputer 201 constitutes an information processing section for executing data processing. The entire or part of the RAM 205 is a nonvolatile memory.

The microcomputer 201 is connected with a display/keyboard controller 206, a storage section 207, a communication interface 208, a printer controller 209 and a scanner controller 210 through the bus line 203.

The display/keyboard controller 206 controls the display device 21 based on the image data, displays an image corresponding to the image data on the display device 21, and acquires input data from the input device 22 into the microcomputer 201.

The storage section 207 is a storage device such as an HDD, and an SSD. The storage section 207 stores various data. The storage section 207 also stores, for example, programs for various processing in the POS terminal 20, a commodity master file, a sales data file and the like (none is shown). The commodity master file stores a unit price, commodity name and the like in association with the commodity code. The sales data file stores transaction number, transaction type, and the sales data in one transaction.

The communication interface 208 enables the POS terminal 20 to carry out data communication with other machines through a connecting wire such as a LAN cable and the like. For example, the communication interface 208 receives the input data sent from the reading apparatus 10. The communication interface 208 also sends a signal for display on the first display section 13 and the second display section 16 to the reading apparatus 10.

The printer controller 209 controls the receipt printer 23 based on the printing data to print an image corresponding to the printing data by the receipt printer 23.

The scanner controller 210 acquires the input data from the reading apparatus 10 into the microcomputer 201. The scanner controller 210 controls the first display section 13 and the second display section 16 to display various images on the first display section 13 and the second display section 16.

Figure 6:
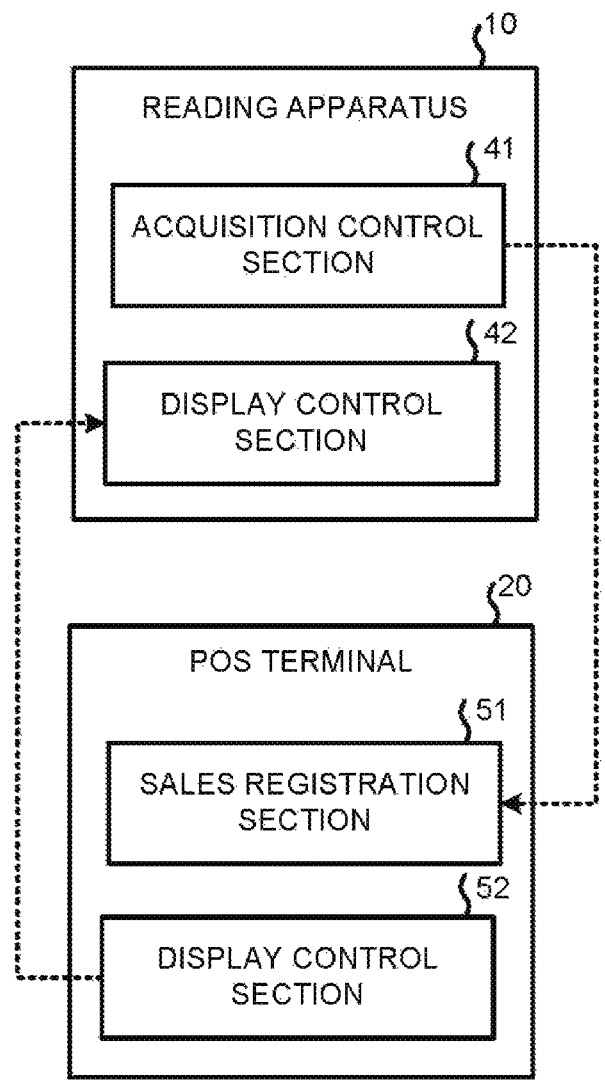
FIG. 6 is a diagram illustrating the functional components of the reading apparatus and the POS terminal.

Next, the functional components of the reading apparatus 10 and the POS terminal 20 are described. FIG. 6 is a diagram illustrating the functional components of the reading apparatus 10 and the POS terminal 20.

The reading apparatus 10 operates according to the programs stored in the storage section 108 to function as an acquisition control section 41 and a display control section 42 as shown in FIG. 6.

The acquisition control section 41 controls acquisition and transmission of the images captured by the first image capturing section 12 and the second image capturing section 15. Specifically, the acquisition control section 41 starts acquisition of the images through the input/output controller 106 if the transaction start is instructed through an operation on the keyboard 14 or the first display section 13, or a signal notified from the POS terminal 20.

The acquisition control section 41 sends the acquired image data or additional information to the POS terminal 20 through the communication interface 109. The acquisition control section 41 stops the acquisition of the images if end of the transaction is instructed through an operation on the keyboard 14 or the first display section 13, or a signal notified from the POS terminal 20. The acquisition control section 41 may stop the operations of the first image capturing section 12 and the second image capturing section 15, and in this case, the acquisition control section 41 starts the operations of the first image capturing section 12 and the second image capturing section 15 in response to the transaction start instruction described above.

As stated below, in the POS terminal 20, the processing manner of the image data is different depending on the image captured by the first image capturing section 12 or by the second image capturing section 15. Thus, an identifier for indicating a sending source of the image data (the first image capturing section 12 or the second image capturing section 15) maybe added to the image data by the acquisition control section 41 at the time the image data is acquired to identify whether the image is captured by the first image capturing section 12 or by the second image capturing section 15. Alternatively, the first image capturing section 12 and the second image capturing section 15 add an identifier indicating itself to the image at the time the image is captured.

The display control section 42 controls the display of the first display section 13 and the second display section 16. Specifically, the display control section 42 controls the first display section 13 or the second display section 16 to display various kinds of information such as transaction details and a guidance screen described later on the first display section 13 or the second display section 16 based on a display control signal input from the POS terminal 20.

On the other hand, as shown in FIG. 6, the POS terminal 20 operates according to the programs stored in the storage section 207 to function as a sales registration section 51 and a display control section 52.

The sales registration section 51 executes sales registration processing relating to the sales registration of the commodity. The sales registration section 51 notifies the reading apparatus 10 of the transaction start to start the sales registration processing if receiving an operation instructing the transaction start through the input device 22.

In the sales registration processing, the sales registration section 51 carries out sales registration of the commodity based on the image input from the reading apparatus 10. Specifically, the sales registration section 51 specifies, according to the image (the image of the code symbol attached to the commodity, or the object image of the whole or part of the commodity) captured by the first image capturing section 12, the commodity corresponding to the image from the commodity master file, and carries out sales registration of the specified commodity.

If the image captured by the second image capturing section 15 is received, the sales registration section 51 executes the predetermined processing corresponding to the image. For example, in a case in which the image captured by the second image capturing section 15 is a service card such as a membership card, a point card and the like, the sales registration section 51 reads identification information (membership number and the like) for identifying the customer from the image. Then the sales registration section 51 gives points calculated according to the total amount of the transaction in association with the identification information. In a case in which the image captured by the second image capturing section 15 is service or complementary information indicating to provide a discount and the like, the content in the service or complementary information is read from the image, and the processing corresponding to the content such as a discount is applied to the total amount of the transaction. The technology for reading (recognizing) character string from the image is a well-known/well-used technology such as an OCR (Optical Character Reader), and therefore the explanation thereof is omitted.

If an operation instructing end of the transaction is received through the input device 22, the sales registration section 51 notifies the reading apparatus 10 of the end of the transaction to terminate the sales registration processing.

The display control section 52 controls the screen to be displayed on the reading apparatus 10 through the cooperation with the display control section 42 of the reading apparatus 10. Specifically, the display control section 52 generates display data for the transaction details corresponding to the sales registration processing carried out by the sales registration section 51 and displays the data on the first display section 13 and the second display section 16. The transaction details include, for example, the commodity name, unit price, total amount. The display control section 52 displays the display data for the transaction details on the second display section 16 from the start of the sales registration processing until at least the transaction is finalized or completely registered. The display control section 52 also displays a message or an image for instructing the reading by the second image capturing section 15 on the second display section 16.

The programs executed in the reading apparatus 10 and the POS terminal 20 of the present embodiment are recorded in a computer-readable recording medium such as CD-ROM, flexible disk (FD), CD-R, DVD (Digital Versatile Disk) and the like in the form of installable or executable file.

Further, the programs executed in the reading apparatus 10 and the POS terminal 20 of the present embodiment may be stored in a computer connected with a network such as Internet, and downloaded via the network. Further, the programs executed in the reading apparatus 10 and the POS terminal 20 of the present embodiment may also be provided or distributed via a network such as the Internet.

Figure 7:
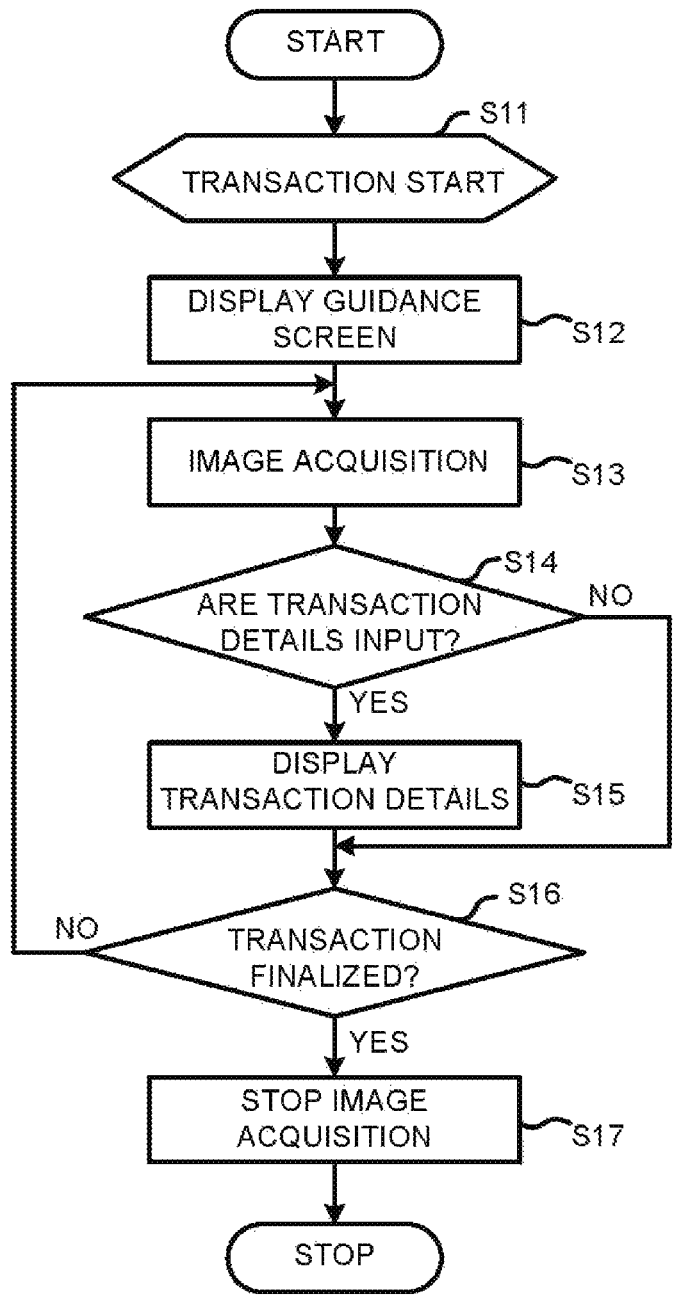
FIG. 7 is a flowchart illustrating an example of reading processing carried out by the reading apparatus.

Operation of the POS system 1 is described. First, the reading processing carried out by the reading apparatus 10 is described with reference to FIG. 7. FIG. 7 is a flowchart illustrating an example of the reading processing carried out by the reading apparatus 10.

If the start of the transaction is instructed (ACT S11), the display control section 42 of the reading apparatus 10 displays a message or an image for instructing the reading by the second image capturing section 15 on the second display section 16 as a guidance screen through the cooperation with the display control section 52 of the POS terminal 20 (ACT S12).

Next, the acquisition control section 41 starts to acquire images from the first image capturing section 12 and the second image capturing section 15 (ACT S13). In this way, the acquired images are sent to the POS terminal 20.

When the transaction is started, the operator of the reading apparatus 10 holds the commodities to be purchased over the image capturing window 11*a* one by one to read (photograph) the commodities in sequence. In this way, the images of the commodities are output sequentially from the first image capturing section 12.

On the other hand, in the reading apparatus 10 of the present embodiment, the customer inputs various kinds of information by himself/herself through the second image capturing section 15 oriented to the customer side. Thus, the customer can hold the membership card, advertisement medium or the display screen of the information communication terminal toward the second image capturing section 15 to input additional information such as identification information and the like while the commodities are read by the operator.

In this way, since the reading (photographing) of the commodities and the reading of the additional information can be carried out in parallel, the work efficiency relating to the reading work can be improved. Further, since time and labor of showing, for example, the information communication terminal or the member card to the operator by the customer can be saved, customer convenience can be enhanced.

Next, the display control section 42 determines whether or not the display data of the transaction details is input from the POS terminal 20 (ACT S14). If it is determined that the display data of the transaction details is not input (NO in ACT S14), the processing in ACT S16 is executed. If it is determined that the display data of the transaction details is input (YES in ACT S14), the display control section 42 displays the transaction details on the first display section 13 and the second display section 16 (ACT S15), and then the processing in ACT S16 is executed.

The microcomputer 101 of the reading apparatus 10 executes the processing in ACT S13-ACT S15 repeatedly (NO in ACT S16) until the transaction is finalized through an operation on the POS terminal 20. Then if an instruction for finalizing the transaction is received (YES in ACT S16), the acquisition control section 41 stops the acquisition of the images from the first image capturing section 12 and the second image capturing section 15 (ACT S17), and then the present processing is terminated.

Figure 8:
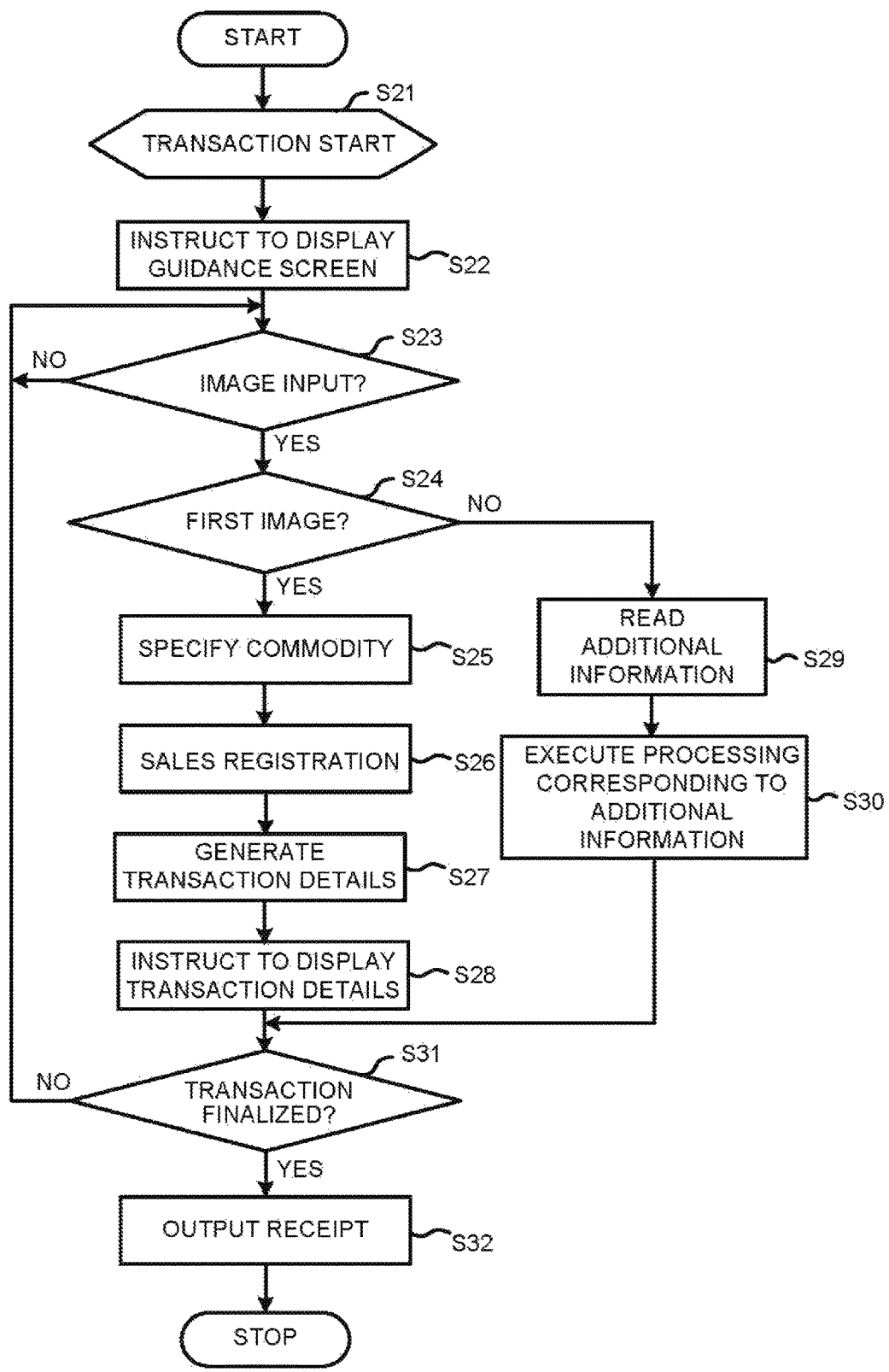
FIG. 8 is a flowchart illustrating an example of sales registration processing carried out by the POS terminal.

Next, the sales registration processing carried out by the POS terminal 20 is described with reference to FIG. 8. FIG. 8 is a flowchart illustrating an example of the sales registration processing carried out by the POS terminal 20.

If the start of the transaction is instructed (ACT S21), the display control section 52 of the POS terminal 20 displays a guidance screen for instructing the reading by the second image capturing section 15 on the second display section 16 through the cooperation with the display control section 42 of the reading apparatus 10 (ACT S22).

Next, the sales registration section 51 waits for until an image is input from the reading apparatus 10 (NO in ACT S23). In a case in which an image (first image) acquired from the first image capturing section 12 is input (YES in ACT S23, and YES in ACT S24), the sales registration section 51 specifies the commodity corresponding to the first image from the commodity master file (ACT S25). The sales registration section 51 executes sales registration processing of the specified commodity (ACT S26).

Next, the display control section 52 of the POS terminal 20 generates the display data of the transaction details (commodity name, unit price, total amount and the like) corresponding to the sales registration (ACT S27). The display control section 52 displays the transaction details (display data) on the first display section 13 and the second display section 16 through the cooperation with the display control section 42 of the reading apparatus 10 (ACT S28).

The transaction details in the second display section 16 may be displayed together with the guidance screen; alternatively, the detail screen is displayed after the guidance screen is deleted. For example, in a case in which the image captured by the second image capturing section 15 is already received, the guidance screen is deleted; otherwise, the guidance screen may be resized to a reduced area and the detail screen is displayed in the remaining area to display both screens on the second display section 16.

On the other hand, in a case in which an image acquired from the second image capturing section 15 is input (YES in ACT S23, and NO in ACT S24), the sales registration section 51 reads additional information such as identification information for identifying the customer, the content of the provided service and the like from the image (ACT S29). The sales registration section 51 executes the processing (point giving processing, discount processing and the like) according to the additional information (ACT S30). Further, the processing result in ACT S30 may be displayed on the first display section 13 and the second display section 16.

The microcomputer 201 of the POS terminal 20 executes the processing in ACT S23-ACT S30 repeatedly (NO in ACT S31) until a closing key (not shown) on the keyboard 14 is operated to finalize the transaction. If finalization of the transaction is declared through the operation on the closing key (YES in ACT S31), the microcomputer 201 of the POS terminal 20 outputs the transaction details and the processing result in ACT S30 from the receipt printer 23 (ACT S32), and then the present processing is terminated.

As stated above, in accordance with the present embodiment, the first image capturing section 12 for operator and the second image capturing section 15 for customer are used, and thus reading operations of various kinds of information relating to the transaction (sales registration) can be carried out in parallel with one another. Therefore, the work efficiency relating to the reading work can be improved and customer and shop clerk convenience can be enhanced. Since the second image capturing section 15 is arranged at the upper surface 11b of the reading apparatus 10 (main body 11), the space of the upper surface 11b at which the second image capturing section 15 is mounted is used effectively and thus the reading apparatus 10 can be minimized.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, it is exemplified in the embodiment described above that the display control section 52 of the POS terminal 20 controls display in the reading apparatus 10, however, it is not limited to this. For example, the display control section 42 of the reading apparatus 10 may include the whole or part of the functions of the display control section 52, in this way, the display control section 42 of the reading apparatus 10 can control display by itself. Further, the reading apparatus 10 may include the whole or part of the functions of the sales registration section 51. For example, it is applicable to carry out operations such as reading of the additional information and the specification of the commodity from the images captured by the second image capturing section 15 and the first image capturing section 12 at the side of the reading apparatus 10, and then the reading apparatus 10 outputs the results of the operations to the POS terminal 20.

Furthermore, it is exemplified in the embodiment described above that the POS system 1 is constituted with the reading apparatus 10 (vertical scanner) and the POS terminal 20 which are separated, however, the present invention is not limited to this. For example, the POS system 1 may be constituted with the reading apparatus 10 and the POS terminal 20 which are integrated.

What is claimed is:

1. A reading apparatus arranged at a position between an operator and a customer who stand in a face-to-face manner, comprising:
   a main body having an opening on a surface thereof facing the operator;
   a first image capturing section for the operator, housed in the main body, configured to photograph a commodity through the opening of the main body to capture an image of the commodity;
   a second image capturing section for the customer, arranged at the main body, configured to photograph an object held by the customer to capture an image of the object;
   a first display section for the operator, arranged above the opening of the main body, configured to display information relating to sales registration processing;
   a processing section configured to execute the sales registration processing; and
   an output section configured to acquire images captured by the first image capturing section and the second image capturing section to output the images to the processing section, wherein the output section is configured to, when a transaction start is instructed:
   acquire the image captured by the first image capturing section and the second image capturing section, and
   add an identifier to each image, the identifier being indicative of a source that captures an image at a time of the image being acquired, to be output to the processing section, wherein
   the main body has an upper surface inclined downwards from an operator side to a customer side, and
   the second image capturing section is arranged at the inclined upper surface.

2. The reading apparatus according to claim 1, wherein an image photographing direction by the second image capturing section is approximately orthogonal to the inclined upper surface.

3. The reading apparatus according to claim 1, further comprising a second display section for the customer, arranged nearby the second image capturing section, configured to display a guidance screen for instructing the customer to hold the object in front of the second image capturing section so that the object is photographed.

* * * * *